United States Patent
Zhao et al.

(10) Patent No.: US 10,568,127 B2
(45) Date of Patent: Feb. 18, 2020

(54) METHOD AND DEVICE FOR DETERMINING DATA TRANSMISSION SCHEME

(71) Applicant: Huawei Technologies Co., Ltd., Shenzhen (CN)

(72) Inventors: Anmeng Zhao, Shenzhen (CN); Kaibing Zhang, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 17 days.

(21) Appl. No.: 15/764,229

(22) PCT Filed: Sep. 29, 2015

(86) PCT No.: PCT/CN2015/091118
§ 371 (c)(1),
(2) Date: Mar. 28, 2018

(87) PCT Pub. No.: WO2017/054137
PCT Pub. Date: Apr. 6, 2017

(65) Prior Publication Data
US 2018/0288796 A1  Oct. 4, 2018

(51) Int. Cl.
*H04W 72/14* (2009.01)
*H04B 17/309* (2015.01)
(Continued)

(52) U.S. Cl.
CPC .......... *H04W 72/14* (2013.01); *H04B 17/309* (2015.01); *H04W 24/08* (2013.01); *H04W 84/12* (2013.01)

(58) Field of Classification Search
None
See application file for complete search history.

(56) References Cited

U.S. PATENT DOCUMENTS 8,599,736 B2 * 12/2013 Li .................... H04W 72/1268
370/315
2006/0239266 A1 10/2006 Babbar et al.
(Continued)

FOREIGN PATENT DOCUMENTS

CN   102448105 A   5/2012
CN   102388667 B   12/2013
(Continued)

OTHER PUBLICATIONS

Machine Translation and Abstract of Japanese Publication No. JP2014027439, Feb. 6, 2014, 30 pages.
(Continued)

*Primary Examiner* — Michael J Moore, Jr.
(74) *Attorney, Agent, or Firm* — Conley Rose, P.C.

(57) ABSTRACT

A method and a device for determining a data transmission scheme, where the method includes obtaining, by a wireless data terminal, first environment quality information of the wireless data terminal, determining, by the wireless data terminal, from at least two candidate data transmission schemes, a first data transmission scheme corresponding to the first environment quality information, where each of the at least two candidate data transmission schemes includes parameters used for communicating with user equipment, and setting, by the wireless data terminal, the first data transmission scheme to communicate with the user equipment.

14 Claims, 6 Drawing Sheets

(51) Int. Cl.
*H04W 24/08* (2009.01)
*H04W 84/12* (2009.01)

(56) References Cited

U.S. PATENT DOCUMENTS

| | | | | |
|---|---|---|---|---|
| 2007/0115796 | A1* | 5/2007 | Jeong | H04L 1/0026 370/203 |
| 2011/0243100 | A1* | 10/2011 | Ball | H04B 7/0689 370/335 |
| 2011/0274043 | A1* | 11/2011 | Nam | H04L 5/001 370/328 |
| 2012/0177020 | A1 | 7/2012 | Chou et al. | |
| 2012/0287876 | A1* | 11/2012 | Kazmi | H04B 7/022 370/329 |
| 2013/0028309 | A1* | 1/2013 | Park | H04L 1/0015 375/227 |
| 2013/0114427 | A1* | 5/2013 | Maattanen | H04B 7/024 370/252 |
| 2013/0170434 | A1* | 7/2013 | Zhang | H04B 7/0874 370/328 |
| 2014/0256327 | A1* | 9/2014 | Wang | H04W 48/20 455/437 |
| 2015/0181440 | A1 | 6/2015 | Chen et al. | |
| 2016/0066301 | A1* | 3/2016 | Zhu | H04W 28/18 370/329 |
| 2018/0007724 | A1* | 1/2018 | Kazmi | H04W 8/005 |

FOREIGN PATENT DOCUMENTS

| | | |
|---|---|---|
| JP | 2008538690 A | 10/2008 |
| JP | 2009538023 A | 10/2009 |
| JP | 4882119 B2 | 2/2012 |
| JP | 2014027439 A | 2/2014 |
| WO | 2007135627 A2 | 11/2007 |
| WO | 2010148536 A1 | 12/2010 |

OTHER PUBLICATIONS

Foreign Communication From A Counterpart Application, Japanese Application No. 2018-535214, Japanese Office Action dated Mar. 25, 2019, 3 pages.
Foreign Communication From A Counterpart Application, Japanese Application No. 2018-535214, English Translation of Japanese Office Action dated Mar. 25 2019, 4 pages.
Machine Translation and Abstract of Japanese Publication No. JP4882119, Feb. 22, 2012, 34 pages.
Machine Translation and Abstract of International Publication No. WO2010148536, Dec. 29, 2010, 13 pages.
Foreign Communication From A Counterpart Application, European Application No. 15905049.1, Extended European Search Report dated Jul. 26, 2018, 7 pages.
Machine Translation and Abstract of Chinese Publication No. CN102388667, Dec. 25, 2013, 14 pages.
Machine Translation and Abstract of Chinese Publication No. CN102448105, May 9, 2012, 18 pages.
Foreign Communication From A Counterpart Application, PCT Application No. PCT/CN2015/091118, English Translation of International Search Report dated Jun. 8, 2016, 2 pages.
Foreign Communication From A Counterpart Application, PCT Application No. PCT/CN2015/091118, English Translation of Written Opinion dated Jun. 8, 2016, 6 pages.

* cited by examiner

METHOD AND DEVICE FOR DETERMINING DATA TRANSMISSION SCHEME

CROSS-REFERENCE TO RELATED APPLICATION

This application is a U.S. National Stage of International Patent Application No. PCT/CN2015/091118 filed on Sep. 29, 2015, which is hereby incorporated by reference in its entirety.

TECHNICAL FIELD

Embodiments of the present disclosure relate to the field of communications technologies, and in particular, to a method and a device for determining a data transmission scheme.

BACKGROUND

A wireless data terminal device may also be referred to as a mobile broadband (MBB) device. It may be a portable WI-FI device or a wireless data card device. Further, the wireless data terminal device may receive a radio signal sent by a base station (for example, an Long Term Evolution (LTE) network signal or a Universal Mobile Telecommunications System (UMTS) network signal), and convert the signal sent by the base station into a signal used for Internet access of user equipment.

In some other approaches, a data transmission scheme used for communication between the wireless data terminal device and a user-end Internet device (which may also be referred to as user equipment) is fixed. However, a wireless network environment in which the wireless data terminal device is located is complex. The wireless environment varies when the wireless data terminal device is at different locations. The wireless data terminal device cannot adjust the data transmission scheme at any time. Therefore, user experience is affected.

SUMMARY

Embodiments of the present disclosure provide a method and a device for determining a data transmission scheme such that a wireless data terminal device can adjust a used data transmission scheme according to a change of a wireless environment and improve user experience.

According to a first aspect, a method for determining a data transmission scheme is provided, where the method includes obtaining, by a wireless data terminal, first environment quality information of the wireless data terminal, determining, by the wireless data terminal, from at least two candidate data transmission schemes, a first data transmission scheme corresponding to the first environment quality information, where each of the at least two candidate data transmission schemes includes parameters used for communicating with user equipment, and setting, by the wireless data terminal, the first data transmission scheme to communicate with the user equipment.

With reference to the first aspect, in a first possible implementation manner of the first aspect, setting, by the wireless data terminal, the first data transmission scheme to communicate with the user equipment, includes determining whether the first data transmission scheme is the same as a data transmission scheme currently used by the wireless data terminal device, and keeping the currently used data transmission scheme unchanged if the first data transmission scheme is the same as the data transmission scheme currently used by the wireless data terminal device, or setting the first data transmission scheme to communicate with the user equipment if the first data transmission scheme is different from the data transmission scheme currently used by the wireless data terminal device.

With reference to the first aspect or the first possible implementation manner of the first aspect, in a second possible implementation manner of the first aspect, obtaining, by a wireless data terminal, first environment quality information, includes obtaining, by the wireless data terminal device, the first environment quality information when a data transmission scheme reconfiguration timer times out, where the data transmission scheme reconfiguration timer is used to determine a time at which the first environment quality information needs to be obtained, and obtaining, by the wireless data terminal device, the first environment quality information when a data transmission scheme reconfiguration timer times out, includes restarting, by the wireless data terminal, the data transmission scheme reconfiguration timer when obtaining the first environment quality information, or restarting, by the wireless data terminal, the data transmission scheme reconfiguration timer when determining, from the at least two candidate data transmission schemes, the first data transmission scheme corresponding to the first environment quality information.

With reference to the first aspect or the first possible implementation manner of the first aspect, in a third possible implementation manner of the first aspect, obtaining, by a wireless data terminal, first environment quality information, includes obtaining, by the wireless data terminal, the first environment quality information when receiving a data transmission scheme reconfiguration request sent by the user equipment.

With reference to any one of the first aspect or the foregoing possible implementation manners of the first aspect, in a fourth possible implementation manner of the first aspect, the environment quality information includes at least one of a service rate, a reference signal received power (RSRP), a received signal code power (RSCP), a signal to interference plus noise ratio (SINR), a bit error rate, a quality of service (QoS) negotiated rate, or a channel quality indicator (CQI).

With reference to any one of the first aspect or the foregoing possible implementation manners of the first aspect, in a fifth possible implementation manner of the first aspect, setting, by the wireless data terminal, the first data transmission scheme to communicate with the user equipment, includes setting, by the wireless data terminal, the first data transmission scheme to communicate with the user equipment through a Universal Serial Bus (USB) interface, and each of the at least two candidate data transmission schemes includes at least one of an indication about whether to enable the Fast Internet Protocol (IP), a USB aggregate packet size, or a USB packet transmission timeout timer threshold.

With reference to any one of the first aspect or the first possible implementation manner to the fourth possible implementation manner of the first aspect, in a sixth possible implementation manner of the first aspect, setting, by the wireless data terminal, the first data transmission scheme to communicate with the user equipment, includes communicating, by the wireless data terminal device, with the user equipment through a WI-FI access point (AP) interface, and each of the at least two candidate data transmission schemes includes at least one of an indication about whether to enable Fast IP or a WI-FI aggregate medium access control service data unit (AMSDU) window size.

With reference to any one of the first aspect or the foregoing possible implementation manners of the first aspect, in a seventh possible implementation manner of the first aspect, before obtaining, by a wireless data terminal device, the first environment quality information, the method further includes starting, by the wireless data terminal, and setting a default data transmission scheme to communicate with the user equipment, where the default data transmission scheme belongs to the at least two candidate data transmission schemes.

According to a second aspect, a wireless data terminal device is provided, where the device includes an obtaining unit configured to obtain first environment quality information of the wireless data terminal device, a determining unit configured to determine, from at least two candidate data transmission schemes, a first data transmission scheme corresponding to the first environment quality information, where each candidate data transmission in the at least two candidate data transmission schemes includes parameters used for communicating with user equipment, and a user-oriented communications unit configured to use the first data transmission scheme to communicate with the user equipment.

With reference to the second aspect, in a first possible implementation manner of the second aspect, the determining unit is further configured to determine whether the first data transmission scheme is the same as a data transmission scheme currently used by the user-oriented communications unit, and determine that the user-oriented communications unit keeps the currently used data transmission scheme unchanged if the first data transmission scheme is the same as the data transmission scheme currently used by the user-oriented communications unit, or determine that the user-oriented communications unit uses the first data transmission scheme to communicate with the user equipment if the first data transmission scheme is different from the data transmission scheme currently used by the user-oriented communications unit.

With reference to the second aspect or the first possible implementation manner of the second aspect, in a second possible implementation manner of the second aspect, the device further includes a data transmission scheme reconfiguration timing unit configured to start timing when the wireless data terminal device starts, the obtaining unit is further configured to obtain the first environment quality information when the data transmission scheme reconfiguration timing unit times out, and the data transmission scheme reconfiguration timing unit is further configured to restart when the obtaining unit obtains the first environment quality information, or restart when the determining unit determines, from the at least two candidate data transmission schemes, the first data transmission scheme corresponding to the first environment quality information.

With reference to the second aspect or the first possible implementation manner of the second aspect, in a third possible implementation manner of the second aspect, the device further includes a receiving unit configured to receive a data transmission scheme reconfiguration request sent by the user equipment, and the obtaining unit is further configured to obtain the first environment quality information when the receiving unit receives the data transmission scheme reconfiguration request.

With reference to any one of the second aspect or the foregoing possible implementation manners of the second aspect, in a fourth possible implementation manner of the second aspect, the wireless environment quality information includes at least one of a service rate, an RSRP, an RSCP, an SINR, a bit error rate, a QoS negotiated rate, or a CQI.

With reference to any one of the second aspect or the foregoing possible implementation manners of the second aspect, in a fifth possible implementation manner of the second aspect, the user-oriented communications unit includes a USB interface unit, and each of the at least two candidate data transmission schemes includes at least one of an indication about whether to enable the Fast IP, a USB aggregate packet size, or a USB packet transmission timeout timer threshold.

With reference to any one of the second aspect or the first possible implementation manner to the fourth possible implementation manner of the second aspect, in a sixth possible implementation manner of the second aspect, the user-oriented communications unit includes a WI-FI AP interface unit, and each of the at least two candidate data transmission schemes includes at least one of an indication about whether to enable Fast IP or a WI-FI AMSDU window size.

With reference to any one of the second aspect or the foregoing possible implementation manners of the second aspect, in a seventh possible implementation manner of the second aspect, the determining unit is further configured to determine that the wireless data terminal starts, and determine that the user-oriented communications unit sets the default data transmission scheme to communicate with the user equipment, where the default data transmission scheme belongs to the at least two candidate data transmission schemes.

According to a third aspect, a wireless data terminal device is provided, where the device includes a processor configured to obtain first environment quality information of the wireless data terminal device, where the processor is further configured to determine, from at least two candidate data transmission schemes, a first data transmission scheme corresponding to the first environment quality information, where each candidate data transmission in the at least two candidate data transmission schemes includes parameters used for communicating with user equipment, and a user-oriented communications interface configured to set the first data transmission scheme to communicate with the user equipment.

With reference to the third aspect, in a first possible implementation manner of the third aspect, the processor is further configured to determine whether the first data transmission scheme is the same as a data transmission scheme currently used by the user-oriented communications interface, and determine that the user-oriented communications interface keeps the currently used data transmission scheme unchanged if the first data transmission scheme is the same as the data transmission scheme currently used by the user-oriented communications interface, or determine that the user-oriented communications interface uses the first data transmission scheme to communicate with the user equipment if the first data transmission scheme is different from the data transmission scheme currently used by the user-oriented communications interface.

With reference to the third aspect, in a second possible implementation manner of the third aspect, the device further includes a data transmission scheme reconfiguration timer configured to start timing when the wireless data terminal device starts, the processor is further configured to obtain the first environment quality information when the data transmission scheme reconfiguration timer times out, and the data transmission scheme reconfiguration timer is further configured to restart when the processor obtains the first environment quality information, or restart when the processor determines, from the at least two candidate data transmission schemes, the first data transmission scheme corresponding to the first environment quality information.

With reference to the third aspect or the first possible implementation manner of the third aspect, in a third possible implementation manner of the third aspect, the device further includes a transceiver circuit configured to receive a data transmission scheme reconfiguration request sent by the user equipment, and the processor is further configured to obtain the first environment quality information when the transceiver circuit receives the data transmission scheme reconfiguration request.

With reference to any one of the third aspect or the foregoing possible implementation manners of the third aspect, in a fourth possible implementation manner of the third aspect, the wireless environment quality information includes at least one of a service rate, an RSRP, an RSCP, an SINR, a bit error rate, a QoS negotiated rate, or a CQI.

With reference to any one of the third aspect or the foregoing possible implementation manners of the third aspect, in a fifth possible implementation manner of the third aspect, the user-oriented communications interface includes a USB interface, and each of the at least two candidate data transmission schemes includes at least one of an indication about whether to enable the Fast IP, a USB aggregate packet size, or a USB packet transmission timeout timer threshold.

With reference to any one of the third aspect or the first possible implementation manner to the fourth possible implementation manner of the third aspect, in a sixth possible implementation manner of the third aspect, the user-oriented communications interface includes a WI-FI AP interface, and each of the at least two candidate data transmission schemes includes at least one of an indication about whether to enable Fast IP or a WI-FI AMSDU window size.

With reference to any one of the third aspect or the foregoing possible implementation manners of the third aspect, in a seventh possible implementation manner of the third aspect, the processor is further configured to determine that the wireless data terminal starts, and determine that the user-oriented communications interface sets the default data transmission scheme to communicate with the user equipment, where the default data transmission scheme belongs to the at least two candidate data transmission schemes.

In the foregoing technical solutions, a wireless data terminal device can select an appropriate data transmission scheme according to wireless environment quality to communicate with user equipment. In this case, the wireless data terminal device can adjust the data transmission scheme according to different wireless environment quality such that a better network service can be provided for the user equipment. In addition, performance of the wireless data terminal device is also improved.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, such as a Global System for Mobile Communications (GSM) system, a Code Division Multiple Access (CDMA) system, a Wideband CDMA (WCDMA) system, a general packet radio service (GPRS), an LTE system, an LTE frequency division duplex (FDD) system, an LTE time division duplex (TDD), a UMTS, or the like.

User equipment, also referred to as a mobile terminal (MT), mobile user equipment, or the like, is a device that can access the Internet in a wired or wireless manner. The user equipment may be a mobile terminal, for example, a mobile phone (or referred to as a "cellular" phone), or a computer having a mobile terminal. For example, the user equipment may be a portable, pocket-sized, handheld, computer built-in, or in-vehicle mobile apparatus, or may be a device that can be used for Internet access by a user, such as a desktop computer.

A base station may be a base transceiver station (BTS) in GSM or CDMA, may be a NodeB in WCDMA, or may be an evolved Node B (eNB or e-NodeB) in LTE. This is not limited in the present disclosure.

Figure 1:
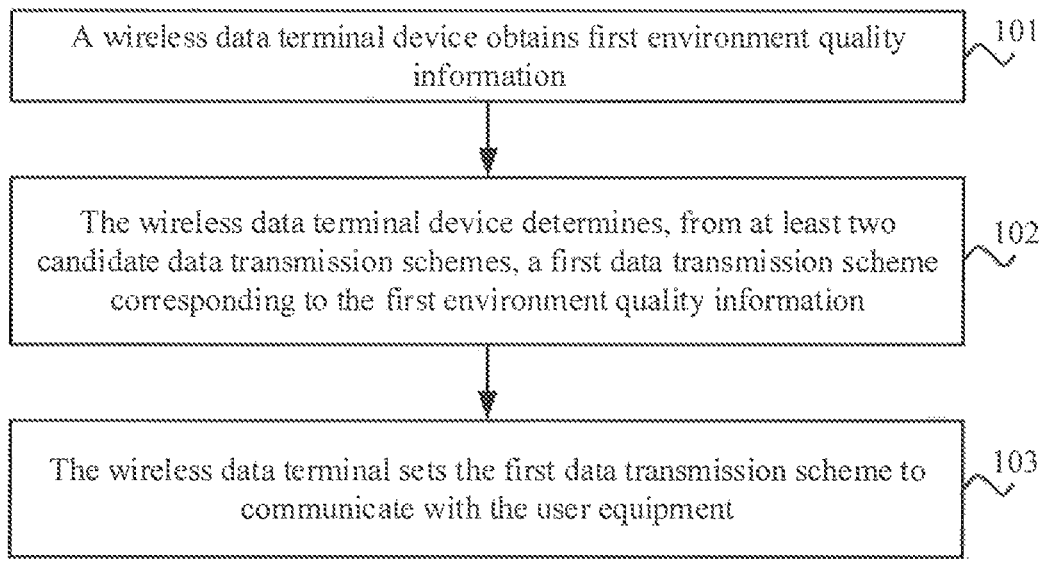
FIG. 1 is a schematic flowchart of a method for determining a data transmission scheme according to an embodiment of the present disclosure.

FIG. 1 is a schematic flowchart of a method for determining a data transmission scheme according to an embodiment of the present disclosure.

Step 101: A wireless data terminal device obtains first environment quality information.

Step 102: The wireless data terminal device determines, from at least two candidate data transmission schemes, a first data transmission scheme corresponding to the first environment quality information, where each of the at least two candidate data transmission schemes includes parameters used for communicating with user equipment.

Step 103: The wireless data terminal sets the first data transmission scheme to communicate with the user equipment.

According to the method shown in FIG. 1, the wireless data terminal device can select an appropriate data transmission scheme according to wireless environment quality to communicate with the user equipment. In this case, the wireless data terminal device can adjust the data transmission scheme according to different wireless environment quality such that a better network service can be provided for the user equipment. In addition, performance of the wireless data terminal device is also improved.

Optionally, in an embodiment, that the wireless data terminal uses the first data transmission scheme to communicate with the user equipment includes determining whether the first data transmission scheme is the same as a data transmission scheme currently used by the wireless data terminal device, and keeping the currently used data transmission scheme unchanged if the first data transmission scheme is the same as the data transmission scheme currently used by the wireless data terminal device, or setting the first data transmission scheme to communicate with the user equipment if the first data transmission scheme is different from the data transmission scheme currently used by the wireless data terminal device.

Optionally, in another embodiment, the wireless data terminal may further directly determine to set the first data transmission scheme to communicate with the user equipment, without comparing the currently used data transmission scheme with the first data transmission scheme.

Optionally, in an embodiment, that a wireless data terminal device obtains first environment quality information includes that when a data transmission scheme reconfiguration timer times out, the wireless data terminal device obtains the first environment quality information, where the data transmission scheme reconfiguration timer is used to determine a time at which the first environment quality information needs to be obtained. In this case, the method further includes that when obtaining the first environment quality information, the wireless data terminal device restarts the data transmission scheme reconfiguration timer, or when determining, from the at least two candidate data transmission schemes, the first data transmission scheme corresponding to the first environment quality information, the wireless data terminal device restarts the data transmission scheme reconfiguration timer.

Optionally, in another embodiment, that a wireless data terminal device obtains first environment quality information includes that when receiving a data transmission scheme reconfiguration request sent by the user equipment, the wireless data terminal device obtains the first environment quality information.

Optionally, the environment quality information is related information used for measuring quality of a wireless environment in which the wireless data terminal device is located. The environment quality information includes at least one of a service rate, an RSRP, an RSCP, an SINR, a QoS negotiated rate, or a CQI.

Optionally, the wireless data terminal device may communicate with the user equipment through a USB interface and/or a WI-FI AP interface.

Optionally, in an embodiment, that the wireless data terminal sets the first data transmission scheme to communicate with the user equipment includes that the wireless data terminal communicates with the user equipment using the USB interface. In this case, each of the at least two candidate data transmission schemes includes at least one of an indication about whether to enable the Fast IP, a USB aggregate packet size, or a USB packet transmission timeout timer threshold.

Optionally, in another embodiment, that the wireless data terminal sets the first data transmission scheme to communicate with the user equipment includes that the wireless data terminal device communicates with the user equipment through the WI-FI AP interface. In this case, each of the at least two candidate data transmission schemes includes at least one of the following parameters an indication about whether to enable Fast IP or a WI-FI AMSDU window size.

Before the wireless data terminal device obtains the first environment quality information, the method further includes that the wireless data terminal device starts and sets a default data transmission scheme to communicate with the user equipment, where the default data transmission scheme belongs to the at least two candidate data transmission schemes.

Figure 2:
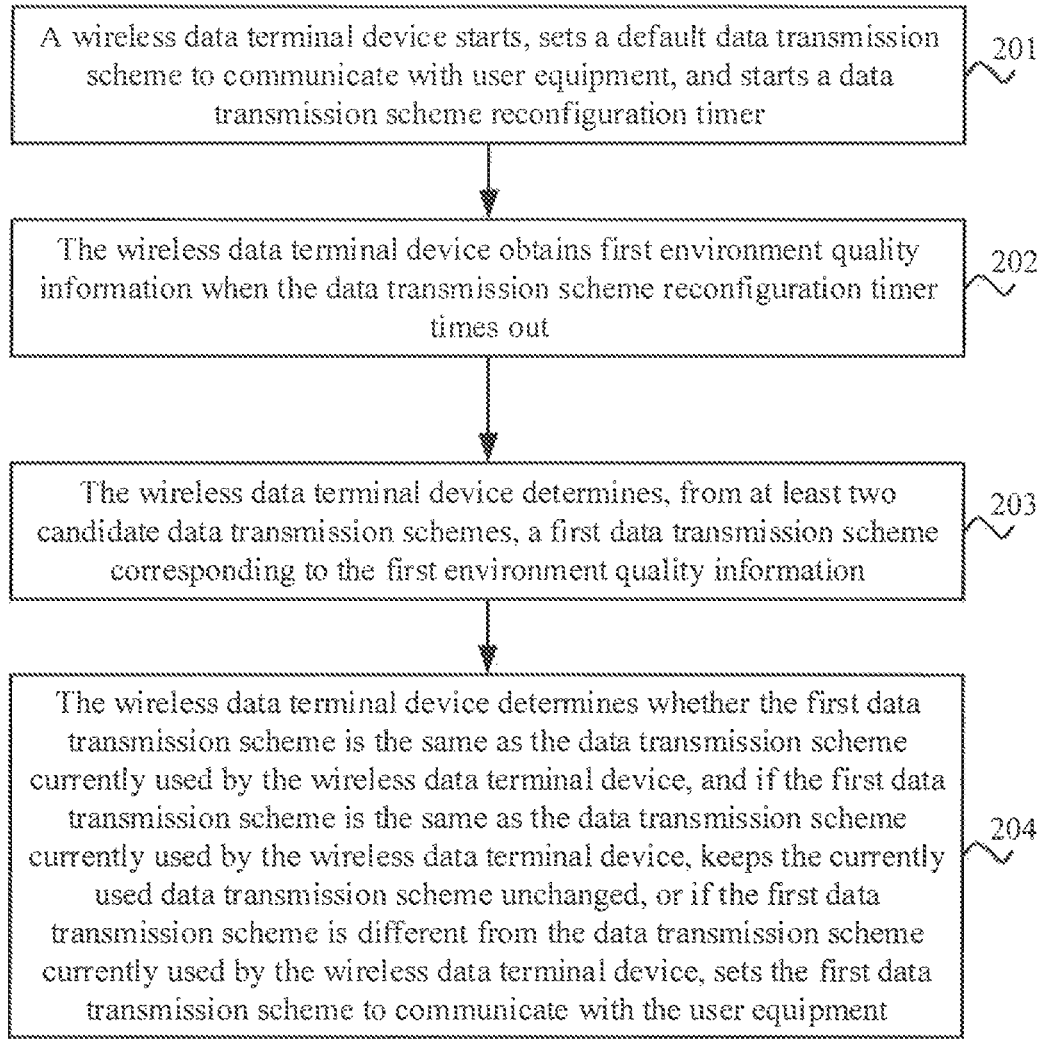
FIG. 2 is a schematic flowchart of another method for determining a data transmission scheme according to an embodiment of the present disclosure.

FIG. 2 is a schematic flowchart of another method for determining a data transmission scheme according to an embodiment of the present disclosure.

Step 201: A wireless data terminal device starts, sets a default data transmission scheme to communicate with user equipment, and starts a data transmission scheme reconfiguration timer.

Step 202: The wireless data terminal device obtains first environment quality information when the data transmission scheme reconfiguration timer times out. The environment quality information is related information used for measuring quality of a wireless environment in which the wireless data terminal device is located. The environment quality information includes at least one of a service rate, an RSRP, an RSCP, an SINR, a bit error rate, a QoS negotiated rate, or a CQI. A person skilled in the art may understand that the service rate may include any one or more of an uplink rate, a downlink rate, a real-time rate, or a subscribed rate. The subscribed rate is a rate that the wireless data terminal device applies for from an operator. The real-time rate is a maximum value of the uplink rate and the downlink rate.

A person skilled in the art may understand that if more information is included in the environment quality information, current wireless environment quality can be better reflected, and further, an appropriate data transmission scheme can be selected more properly.

Step 203: The wireless data terminal device determines, from at least two candidate data transmission schemes, a first data transmission scheme corresponding to the first environment quality information, where each candidate data transmission in the at least two candidate data transmission schemes includes parameters used for communicating with the user equipment, and the at least two candidate data transmission schemes include the default data transmission scheme.

Table 1 is a schematic drawing including four candidate data transmission schemes.

TABLE 1

| No. | Condition | Indication about whether to enable Fast IP | USB aggregate packet size | USB packet transmission timeout timer threshold | WI-FI AMSDU window size |
|---|---|---|---|---|---|
| 1 | Default | No | 5 kilobytes (KB) | 20 milliseconds (ms) | 32 Kbytes |
| 2 | Downlink rate >100 megabits per second (Mbps) RSRP >−80 decibel-milliwatts (dBm) Subscribed rate > Real-time rate SINR >30 decibels (dB) CQI >12 | Yes | 8 KB | 20 ms | 64 KB |
| 3 | 10 Mbps < Downlink rate < 50 Mbps −110 dBm < RSRP < −90 dBm Subscribed rate > Real-time rate 10 dB < SINR < 20 dB 5 < CQI < 12 | No | 4 KB | 10 ms | 16 KB |
| 4 | DL rate < Subscribed rate < 10 Mbps RSRP <−110 dBm SINR <10 dB CQI <5 | No | 2 KB | 10 ms | 8 KB |

The No. 1 data transmission scheme is the default transmission scheme. "Default" indicates that if the wireless environment quality information obtained by the wireless Internet device does not match any one of the No. 2 to the No. 4 conditions, it is considered that the wireless environment quality information matches the "default" condition.

For example, the first environment quality information obtained by the wireless Internet device includes the downlink rate is higher than 100 Mbps, the RSRP is higher than −80 dBm, the subscribed rate is higher than the real-time rate, the SINR is higher than 30 dB, and the CQI is greater than 12. In this case, the wireless Internet device may determine that the first environment quality information complies with the condition of the No. 2 data transmission scheme. In this case, the wireless Internet device may determine that the No. 2 data transmission scheme is the first data transmission scheme. For another example, the first environment quality information obtained by the wireless Internet device includes the downlink rate is lower than 100 Mbps, the RSRP is higher than −80 dBm, the subscribed rate is higher than the real-time rate, the SINR is lower than 10 dB, and the CQI is greater than 5. In this case, the wireless Internet device may determine that the first environment quality information does not match the conditions of any one of the No. 2 to the No. 4 data transmission schemes. In this case, the wireless Internet device may determine that the No. 1 data transmission scheme is the first data transmission scheme.

Step 204: The wireless data terminal device determines whether the first data transmission scheme is the same as the data transmission scheme currently used by the wireless data terminal device, and if the first data transmission scheme is the same as the data transmission scheme currently used by the wireless data terminal device, keeps the currently used data transmission scheme unchanged, or if the first data transmission scheme is different from the data transmission scheme currently used by the wireless data terminal device, sets the first data transmission scheme to communicate with the user equipment.

For example, the first data transmission scheme determined by the wireless data terminal device is the No. 2 data transmission scheme. The data transmission scheme used by the wireless data terminal device after power-on is the default data transmission scheme (namely, the No. 1 data transmission scheme). In this case, because the first data transmission scheme is different from the default data transmission scheme, the wireless data terminal device may determine to start using the first data transmission scheme (namely, the No. 2 data transmission scheme) to communicate with the user equipment. For another example, the first data transmission scheme determined by the wireless data terminal device is the No. 1 data transmission scheme. In this case, because the first data transmission scheme is the default data transmission scheme, the wireless data terminal device may keep the currently used data transmission scheme unchanged.

Further, the wireless data terminal device may restart the data transmission scheme reconfiguration timer when obtaining the first environment quality information. The wireless data terminal device may further restart the data transmission scheme reconfiguration timer when determining, from the at least two candidate data transmission schemes, the first data transmission scheme corresponding to the first environment quality information. In this way, when the data transmission scheme timer times out again, an appropriate data transmission scheme may be reselected. The data transmission scheme reconfiguration timer is used to determine a time at which the first environment quality information needs to be obtained. If a timing time of the data transmission scheme reconfiguration timer exceeds a preset time, it is determined that the first environment quality information needs to be obtained. A person skilled in the art may understand that, the data transmission scheme timer may be fixed in the wireless data terminal device during design, or the timing time of the timer may be adjusted manually by a user according to a requirement. This is not limited in the present disclosure.

A person skilled in the art may understand that Table 1 is only a schematic drawing of candidate data transmission schemes. An interface for communication between the wireless data terminal device and the user equipment may include a USB interface and/or a WI-FI AP interface. If the wireless data terminal device can communicate with the user equipment only through the USB interface, the candidate data transmission scheme may include only the indication about whether to enable Fast IP, the USB aggregate packet size, and the USB packet transmission timeout timer threshold. If the wireless data terminal device can communicate with the user equipment only through the WI-FI AP interface, the data transmission scheme may include only the indication about whether to enable Fast IP and the WI-FI AMSDU window size. If the wireless data terminal device can either communicate with the user equipment through the USB interface, or communicate with the user equipment through the WI-FI AP interface, the data transmission scheme may include the indication about whether to enable Fast IP, the USB aggregate packet size, the USB packet transmission timeout timer threshold, and the WI-FI AMSDU window size. In addition, a person skilled in the art may further understand that, if the wireless data terminal device can either communicate with the user equipment through the USB interface, or communicate with the user equipment through the WI-FI AP interface, the wireless data terminal device may adjust corresponding options in the data transmission scheme by determining the currently used interface. For example, if the wireless data terminal device determines that the USB interface is currently used to communicate with the user equipment, when the data transmission scheme needs to be adjusted, the wireless data terminal device adjusts only the indication about whether to enable Fast IP, the USB aggregate packet size, and the USB packet transmission timeout timer threshold. If the wireless data terminal device determines that the WI-FI AP interface is currently used to communicate with the user equipment, when the data transmission scheme needs to be adjusted, the wireless data terminal device adjusts only the indication about whether to enable Fast IP and the WI-FI AMPDU window size.

According to the method shown in FIG. 2, when providing a network service for the user equipment, the wireless data terminal device may obtain current wireless environment quality information at regular time intervals, and select, according to the current wireless environment quality information, an appropriate data transmission scheme to provide the network service for the user equipment. Therefore, user experience may be improved. In addition, performance of the wireless data terminal device is also improved.

For example, as the surrounding environment of the wireless data terminal device becomes better (for example, the wireless network environment of the wireless data terminal device becomes better), or a type of service processed by the user equipment has a higher requirement on network access (for example, the user equipment switches from web browsing to online browsing of high-definition videos), the wireless data terminal device may determine, by obtaining the current wireless environment quality information, to adjust the data transmission scheme from the No. 1 data transmission scheme to the No. 2 data transmission scheme. In this case, the USB aggregate packet size or the WI-FI AMSDU window size may be increased. After the USB aggregate packet or the WI-FI AMSDU window is increased, USB or WI-FI packet transmission efficiency is improved. In addition, because of large aggregate packets in a high-speed data service, load of a central processing unit (CPU) of the wireless data terminal device can also be reduced, and heat dissipation and power consumption of the wireless data terminal device are reduced. In addition, enabling a Fast IP technology in a high-speed service can shorten a data packet transmission path, reduce a data packet transmission delay, and finally improve performance of the wireless data terminal device, thereby providing better Internet service experience for the user. For another example, the surrounding environment of the wireless data terminal device becomes worse (for example, the wireless network environment of the wireless data terminal device becomes worse), or a type of service processed by the user equipment has a lower requirement on network access (for example, the user equipment switches from online browsing of high-definition videos to web browsing). In this case, if the No. 2 data transmission scheme is still used, because the USB aggregate packet is too large or the WI-FI AMSDU window is too large, fast aggregation cannot be performed. In addition, because the USB packet transmission timer threshold is too great, data packets are all buffered by a USB module, and cannot be sent out in time. In this case, the delay on the whole data transmission path is long, and therefore, performance of the wireless data terminal device is reduced. Therefore, by obtaining the current wireless environment quality information, the wireless data terminal may determine to adjust the data transmission scheme from the No. 2 data transmission scheme to the No. 4 data transmission scheme. In this way, the USB aggregate packet size or the WI-FI AMSDU window size may be reduced, the USB packet transmission timer threshold is reduced, and therefore, the foregoing problem may be resolved.

Figure 3:
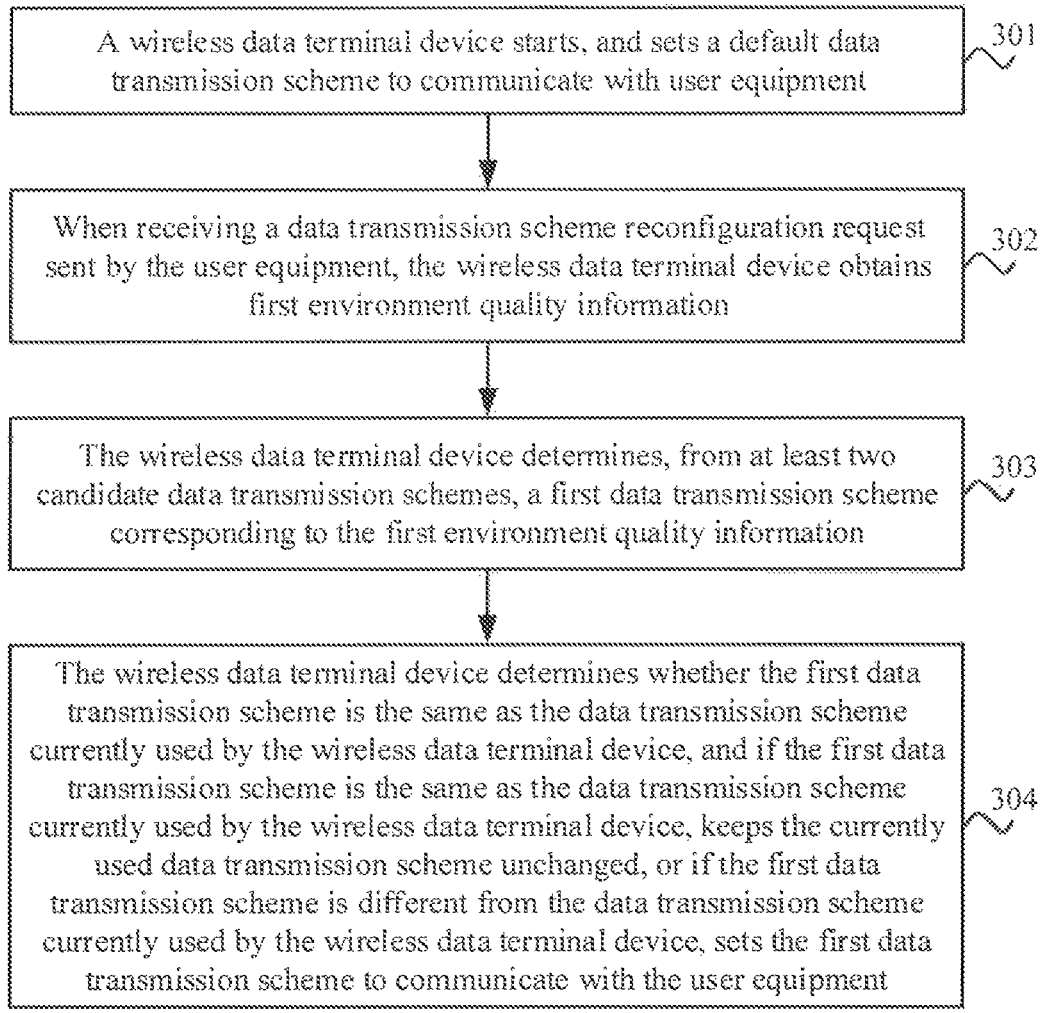
FIG. 3 is a schematic flowchart of another method for determining a data transmission scheme according to an embodiment of the present disclosure.

FIG. 3 is a schematic flowchart of another method for determining a data transmission scheme according to an embodiment of the present disclosure.

Step 301: A wireless data terminal device starts, and sets a default data transmission scheme to communicate with user equipment.

Step 302: When receiving a data transmission scheme reconfiguration request sent by the user equipment, the wireless data terminal device obtains first environment quality information.

The environment quality information is related information used for measuring quality of a wireless environment in which the wireless data terminal device is located. The environment quality information includes at least one of a service rate, an RSRP, an RSCP, an SINR, a bit error rate, a QoS negotiated rate, or a CQI. A person skilled in the art may understand that the service rate may include any one or more of an uplink rate, a downlink rate, a real-time rate, or a subscribed rate. The subscribed rate is a rate that the wireless data terminal device applies for from an operator. The real-time rate is a maximum value of the uplink rate and the downlink rate.

Step 303. The wireless data terminal device determines, from at least two candidate data transmission schemes, a first data transmission scheme corresponding to the first environment quality information, where each candidate data transmission in the at least two candidate data transmission schemes includes parameters used for communicating with the user equipment, and the at least two candidate data transmission schemes include the default data transmission scheme.

Table 2 is a schematic drawing including four candidate data transmission schemes.

TABLE 2

| No. | Condition | Indication about whether to enable Fast IP | USB aggregate packet size | USB packet transmission timeout timer threshold | WI-FI AMSDU window size |
|---|---|---|---|---|---|
| 1 | Default | No | 5 KB | 20 ms | 32 KB |
| 2 | Downlink rate >100 Mbps RSRP >−80 dBm Subscribed rate > Real-time rate SINR >30 dB CQI >12 | Yes | 8 KB | 20 ms | 64 KB |
| 3 | 10 Mbps < Downlink rate < 50 Mbps −110 dBm < RSRP < −90 dBm Subscribed rate > Real-time rate 10 dB < SINR < 20 dB 5 < CQI < 12 | No | 4 KB | 10 ms | 16 KB |
| 4 | DL rate < Subscribed rate < 10 Mbps RSRP <−110 dBm SINR <10 dB CQI <5 | No | 2 KB | 10 ms | 8 KB |

The No. 1 data transmission scheme is the default transmission scheme. "Default" indicates that if the wireless environment quality information obtained by the wireless Internet device does not match any one of the No. 2 to the No. 4 conditions, it is considered that the wireless environment quality information matches the "default" condition.

For example, the first environment quality information obtained by the wireless Internet device includes the downlink rate is higher than 100 Mbps, the RSRP is higher than −80 dBm, the subscribed rate is higher than the real-time rate, the SINR is higher than 30 dB, and the CQI is greater than 12. In this case, the wireless Internet device may determine that the first environment quality information complies with the condition of the No. 2 data transmission scheme. In this case, the wireless Internet device may determine that the No. 2 data transmission scheme is the first data transmission scheme. For another example, the first environment quality information obtained by the wireless Internet device includes the downlink rate is lower than 100 Mbps, the RSRP is higher than −80 dBm, the subscribed rate is higher than the real-time rate, the SINR is lower than 10 dB, and the CQI is greater than 5. In this case, the wireless Internet device may determine that the first environment quality information does not match the conditions of any one of the No. 2 to the No. 4 data transmission schemes. In this case, the wireless Internet device may determine that the No. 1 data transmission scheme is the first data transmission scheme.

Step 304: The wireless data terminal device determines whether the first data transmission scheme is the same as the data transmission scheme currently used by the wireless data terminal device, and if the first data transmission scheme is the same as the data transmission scheme currently used by the wireless data terminal device, keeps the currently used data transmission scheme unchanged, or if the first data transmission scheme is different from the data transmission scheme currently used by the wireless data terminal device, sets the first data transmission scheme to communicate with the user equipment.

For example, the first data transmission scheme determined by the wireless data terminal device is the No. 2 data transmission scheme. The data transmission scheme used by the wireless data terminal device after power-on is the default data transmission scheme (namely, the No. 1 data transmission scheme). In this case, because the first data transmission scheme is different from the default data transmission scheme, the wireless data terminal device may determine to start using the first data transmission scheme (namely, the No. 2 data transmission scheme) to communicate with the user equipment. For another example, the first data transmission scheme determined by the wireless data terminal device is the No. 1 data transmission scheme. In this case, because the first data transmission scheme is the default data transmission scheme, the wireless data terminal device may keep the currently used data transmission scheme unchanged.

According to the method shown in FIG. 3, when the user equipment finds that a network status is poor, or when the user equipment determines that the data transmission scheme needs to be changed, the user equipment may send, to the wireless data terminal device, the data transmission scheme reconfiguration request for requesting to adjust the data transmission scheme. In this case, the wireless data terminal device may obtain current wireless environment quality information, and determine, according to the current wireless environment quality information, whether the data transmission scheme can be adjusted.

For example, if the user finds that the surrounding environment of the wireless data terminal device becomes better (for example, the wireless network environment of the wireless data terminal device becomes better), or a type of service processed by the user equipment has a higher requirement on network access (for example, the user equipment switches from web browsing to online browsing of high-definition videos), the user equipment may request the wireless data terminal device to adjust the data transmission scheme. By obtaining the current wireless environment quality information, the wireless data terminal device may determine, according to the current wireless environment quality information, whether the data transmission scheme can be adjusted. For example, the wireless data terminal device may determine to adjust the data transmission scheme from the No. 1 data transmission scheme to the No. 2 data transmission scheme. In this case, the USB aggregate packet size or the WI-FI AMSDU window size may be increased. After the USB aggregate packet or the WI-FI AMSDU window is increased, USB or WI-FI packet transmission efficiency is improved. In addition, because of large aggregate packets in a high-speed data service, load of a CPU of the wireless data terminal device can also be reduced, and heat dissipation and power consumption of the wireless data terminal device are reduced. In addition, enabling a Fast IP technology in a high-speed service can shorten a data packet transmission path, reduce a data packet transmission delay, and finally improve performance of the wireless data terminal device, thereby providing better Internet service experience for the user. For another example, the user finds that the surrounding environment of the wireless data terminal device becomes worse (for example, the wireless network environment of the wireless data terminal device becomes worse), or a type of service processed by the user equipment has a lower requirement on network access (for example, the user equipment switches from online browsing of high-definition videos to web browsing). In this case, if the No. 2 data transmission scheme is still used, because the USB aggregate packet is too large or the WI-FI AMSDU window is too large, fast aggregation cannot be performed. In addition, because the USB packet transmission timer threshold is too great, data packets are all buffered by a USB module, and cannot be sent out in time. In this case, the delay on the whole data transmission path is long, and therefore, performance of the wireless data terminal device is reduced. The user may find that Internet quality is poor. In this case, the user equipment may request the wireless data terminal device to adjust the data transmission scheme. By obtaining the current wireless environment quality information, the wireless data terminal device may determine, according to the current wireless environment quality information, whether the data transmission scheme can be adjusted. For example, by obtaining the current wireless environment quality information, the wireless data terminal device may determine to adjust the data transmission scheme from the No. 2 data transmission scheme to the No. 4 data transmission scheme. In this way, the USB aggregate packet size or the WI-FI AMSDU window size may be reduced, the USB packet transmission timer threshold is reduced, and therefore, the foregoing problem may be resolved. Internet experience of the user equipment may be improved.

Figure 4:
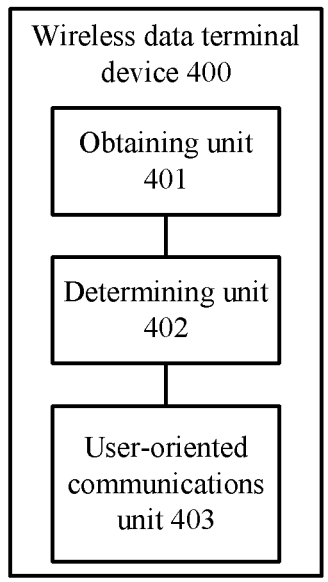
FIG. 4 is a structural block diagram of a wireless data terminal device according to an embodiment of the present disclosure.

FIG. 4 is a structural block diagram of a wireless data terminal device 400 according to an embodiment of the present disclosure. As shown in FIG. 4, the wireless data terminal device 400 includes an obtaining unit 401, a determining unit 402, and a user-oriented communications unit 403.

The obtaining unit 401 is configured to obtain first environment quality information of the wireless data terminal device 400.

The determining unit 402 is configured to determine, from at least two candidate data transmission schemes, a first data transmission scheme corresponding to the first environment quality information, where each of the at least two candidate data transmission schemes includes parameters used for communicating with user equipment.

The user-oriented communications unit 403 is configured to use the first data transmission scheme to communicate with the user equipment.

As shown in FIG. 4, the wireless data terminal device 400 can select an appropriate data transmission scheme according to wireless environment quality to communicate with the user equipment. In this case, the wireless data terminal device 400 can adjust the data transmission scheme according to different wireless environment quality such that a better network service can be provided for the user equipment. In addition, performance of the wireless data terminal device 400 is also improved.

Optionally, in an embodiment, the determining unit 402 is further configured to determine whether the first data transmission scheme is the same as a data transmission scheme currently used by the user-oriented communications unit 403, and determine that the user-oriented communications unit 403 keeps the currently used data transmission scheme unchanged if the first data transmission scheme is the same as the data transmission scheme currently used by the user-oriented communications unit 403, or determine that the user-oriented communications unit 403 uses the first data transmission scheme to communicate with the user equipment if the first data transmission scheme is different from the data transmission scheme currently used by the user-oriented communications unit 403.

Optionally, in another embodiment, the determining unit 402 may be further configured to directly determine that the user-oriented communications unit 403 sets the first data transmission scheme to communicate with the user equipment.

Optionally, the wireless environment quality information includes at least one of a service rate, an RSRP, an RSCP, an SINR, a bit error rate, a QoS negotiated rate, or a CQI.

Optionally, in an embodiment, the user-oriented communications unit 403 includes a USB interface unit. In this case, each of the at least two candidate data transmission schemes includes at least one of an indication about whether to enable Fast IP, a USB aggregate packet size, or a USB packet transmission timeout timer threshold.

Optionally, in another embodiment, the user-oriented communications unit 403 includes a WI-FI AP interface unit. In this case, each of the at least two candidate data transmission schemes includes at least one of an indication about whether to enable Fast IP or a WI-FI AMSDU window size.

Further, the determining unit 402 is further configured to determine that the wireless data terminal starts, and determine that the user-oriented communications unit 403 sets the default data transmission scheme to communicate with the user equipment, where the default data transmission scheme belongs to the at least two candidate data transmission schemes.

Figure 5:
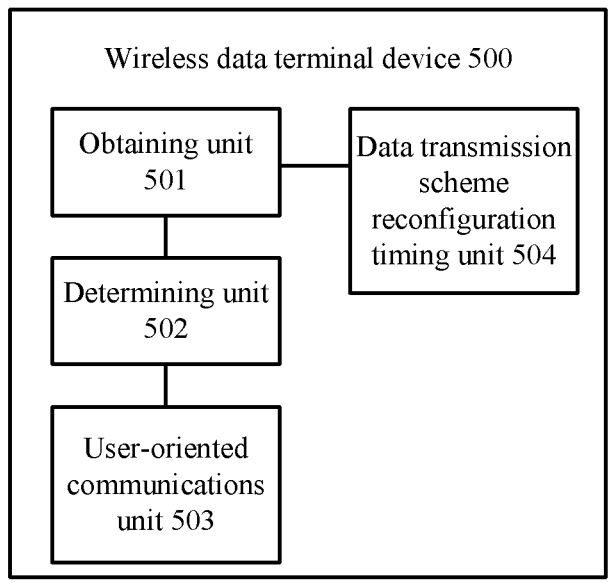
FIG. 5 is a structural block diagram of another wireless data terminal device according to an embodiment of the present disclosure.

FIG. 5 is a structural block diagram of another wireless data terminal device 500 according to an embodiment of the present disclosure. As shown in FIG. 5, the wireless data terminal device 500 includes an obtaining unit 501, a determining unit 502, a user-oriented communications unit 503, and a data transmission scheme reconfiguration timing unit 504.

The obtaining unit 501 is configured to obtain first environment quality information of the wireless data terminal device 500.

The obtaining unit 501 is further configured to obtain the first environment quality information when the data transmission scheme reconfiguration timing unit 504 times out, and the data transmission scheme reconfiguration timing unit 504 is configured to restart when the obtaining unit 501 obtains the first environment quality information, or restart when the determining unit 502 determines, from the at least two candidate data transmission schemes, a first data transmission scheme corresponding to the first environment quality information. A person skilled in the art may understand that, a timing time of the data transmission scheme reconfiguration timing unit 504 may be fixed in the wireless data terminal device 500 during design, or a timing time may be adjusted manually by a user according to a requirement. This is not limited in the present disclosure.

The data transmission scheme reconfiguration timing unit 504 is configured to start timing when the wireless data terminal device 500 starts.

The determining unit 502 is configured to determine, from the at least two candidate data transmission schemes, the first data transmission scheme corresponding to the first environment quality information, where each of the at least two candidate data transmission schemes includes parameters used for communicating with user equipment.

The user-oriented communications unit 503 is configured to set the first data transmission scheme to communicate with the user equipment.

Optionally, in an embodiment, the determining unit 502 is further configured to determine whether the first data transmission scheme is the same as a data transmission scheme currently used by the user-oriented communications unit 503, and determine that the user-oriented communications unit 503 keeps the currently used data transmission scheme unchanged if the first data transmission scheme is the same as the data transmission scheme currently used by the user-oriented communications unit 503, or determine that the user-oriented communications unit 503 sets the first data transmission scheme to communicate with the user equipment if the first data transmission scheme is different from the transmission scheme currently used by the user-oriented communications unit 503.

Optionally, in another embodiment, the determining unit 502 may be further configured to directly determine that the user-oriented communications unit 503 sets the first data transmission scheme to communicate with the user equipment.

As shown in FIG. 5, the wireless data terminal device 500 can select an appropriate data transmission scheme according to wireless environment quality to communicate with the user equipment. In this case, the wireless data terminal device 500 can adjust the data transmission scheme according to different wireless environment quality such that a better network service can be provided for the user equipment. In addition, performance of the wireless data terminal device 500 is also improved.

Optionally, the wireless environment quality information includes at least one of a service rate, an RSRP, an RSCP, an SINR, a bit error rate, a QoS negotiated rate, or a CQI.

Optionally, in an embodiment, the user-oriented communications unit 503 includes a USB interface unit. In this case, each of the at least two candidate data transmission schemes includes at least one of an indication about whether to enable Fast IP, a USB aggregate packet size, or a USB packet transmission timeout timer threshold.

Optionally, in another embodiment, the user-oriented communications unit 503 includes a WI-FI AP interface unit. In this case, each of the at least two candidate data transmission schemes includes at least one of an indication about whether to enable Fast IP or a WI-FI AMSDU window size.

Further, the determining unit 502 is further configured to determine that the wireless data terminal starts, and determine that the user-oriented communications unit 503 sets the default data transmission scheme to communicate with the user equipment, where the default data transmission scheme belongs to the at least two candidate data transmission schemes.

Figure 6:
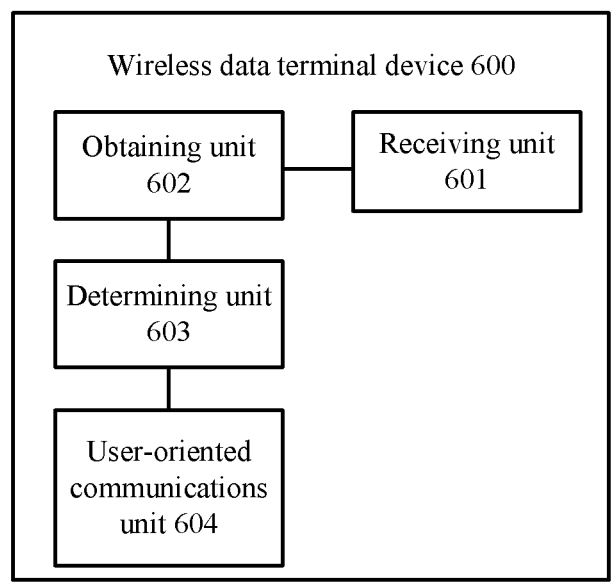
FIG. 6 is a structural block diagram of another wireless data terminal device according to an embodiment of the present disclosure.

FIG. 6 is a structural block diagram of another wireless data terminal device 600 according to an embodiment of the present disclosure. As shown in FIG. 6, the device 600 includes a receiving unit 601, an obtaining unit 602, a determining unit 603, and a user-oriented communications unit 604.

The receiving unit 601 is configured to receive a data transmission scheme reconfiguration request sent by user equipment.

The obtaining unit 602 is configured to obtain first environment quality information when the receiving unit 601 receives the data transmission scheme reconfiguration request.

The determining unit 603 is configured to determine, from at least two candidate data transmission schemes, a first data transmission scheme corresponding to the first environment quality information, where each of the at least two candidate data transmission schemes includes parameters used for communicating with user equipment.

Optionally, in an embodiment, the determining unit 603 is further configured to determine whether the first data transmission scheme is the same as a data transmission scheme currently used by the user-oriented communications unit 604, and determine that the user-oriented communications unit 604 keeps the currently used data transmission scheme unchanged if the first data transmission scheme is the same as the data transmission scheme currently used by the user-oriented communications unit 604, or determine that the user-oriented communications unit 604 sets the first data transmission scheme to communicate with the user equipment if the first data transmission scheme is different from the transmission scheme currently used by the user-oriented communications unit 604.

Optionally, in another embodiment, the determining unit 603 may be further configured to directly determine that the user-oriented communications unit 604 sets the first data transmission scheme to communicate with the user equipment.

The user-oriented communications unit 604 is configured to set the first data transmission scheme to communicate with the user equipment.

As shown in FIG. 6, the wireless data terminal device 600 can select an appropriate data transmission scheme according to wireless environment quality to communicate with the user equipment. In this case, the wireless data terminal device 600 can adjust the data transmission scheme according to different wireless environment quality such that a better network service can be provided for the user equipment. In addition, performance of the wireless data terminal device 600 is also improved.

Optionally, the wireless environment quality information includes at least one of a service rate, an RSRP, an RSCP, an SINR, a bit error rate, a QoS negotiated rate, or a CQI.

Optionally, in an embodiment, the user-oriented communications unit 604 includes a USB interface unit. In this case, each of the at least two candidate data transmission schemes includes at least one of an indication about whether to enable Fast IP, a USB aggregate packet size, or a USB packet transmission timeout timer threshold.

Optionally, in another embodiment, the user-oriented communications unit 604 includes a WI-FI AP interface unit. In this case, each of the at least two candidate data transmission schemes includes at least one of an indication about whether to enable Fast IP or a WI-FI AMSDU window size.

Further, the determining unit 603 is further configured to determine that the wireless data terminal starts, and determine that the user-oriented communications unit 604 sets the default data transmission scheme to communicate with the user equipment, where the default data transmission scheme belongs to the at least two candidate data transmission schemes.

Figure 7:
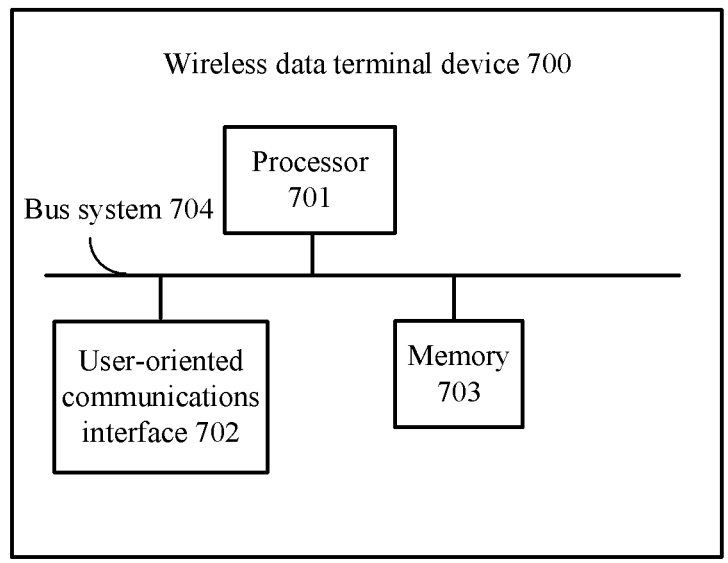
FIG. 7 is a structural block diagram of a wireless data terminal device according to an embodiment of the present disclosure.

FIG. 7 is a structural block diagram of a wireless data terminal device 700 according to an embodiment of the present disclosure. As shown in FIG. 7, the wireless data terminal device 700 includes a processor 701, a user-oriented communications interface 702, and a memory 703.

Components in the wireless data terminal device 700 are coupled together using a bus system 704. The bus system 704 further includes a power bus, a control bus, and a status signal bus, in addition to a data bus. However, for clear description, various buses in FIG. 7 are marked as the bus system 704.

The methods disclosed by the foregoing embodiments of the present disclosure may be applied in the processor 701 or implemented by the processor 701. The processor 701 may be an integrated circuit chip and have a signal processing capability. In an implementation process, each step of the foregoing methods may be completed using an integrated logic circuit of hardware in the processor 701 or an instruction in a form of software. The processor 701 may be a general purpose processor, a digital signal processor (DSP), an application-specific integrated circuit (ASIC), a field programmable gate array (FPGA), or another programmable logic device, discrete gate or transistor logic device, or discrete hardware component. The processor 701 may implement or execute the methods, steps, and logic block diagrams disclosed in the embodiments of the present disclosure. The general purpose processor may be a microprocessor. Alternatively, the processor 701 may be any conventional processor or the like. Steps of the methods disclosed with reference to the embodiments of the present disclosure may be directly executed and completed by means of a hardware decoding processor, or may be executed and completed using a combination of hardware in a decoding processor and software modules. The software modules may be located in a mature storage medium in the art, such as a random access memory (RAM), a flash memory, a read-only memory (ROM), a programmable ROM (PROM), an electrically-erasable PROM (EEPROM), or a register. The storage medium is located in the memory 703. The processor 701 reads instructions in the memory 703 and completes the steps in the foregoing methods in combination with hardware of the processor 701. The memory 703 may be further configured to store at least two candidate data transmission schemes.

The processor 701 is configured to obtain first environment quality information of the wireless data terminal device 700.

The processor 701 is further configured to determine, from the at least two candidate data transmission schemes, a first data transmission scheme corresponding to the first environment quality information, where each of the at least two candidate data transmission schemes includes parameters used for communicating with user equipment.

The user-oriented communications interface 702 is configured to set the first data transmission scheme to communicate with the user equipment.

As shown in FIG. 7, the wireless data terminal device 700 can select an appropriate data transmission scheme according to wireless environment quality to communicate with the user equipment. In this case, the wireless data terminal device 700 can adjust the data transmission scheme according to different wireless environment quality such that a better network service can be provided for the user equipment. In addition, performance of the wireless data terminal device 700 is also improved.

Optionally, in an embodiment, the processor 701 is further configured to determine whether the first data transmission scheme is the same as a data transmission scheme currently used by the user-oriented communications interface 702, and determine that the user-oriented communications interface 702 keeps the currently used data transmission scheme unchanged if the first data transmission scheme is the same as the data transmission scheme currently used by the user-oriented communications interface 702, or determine that the user-oriented communications interface 702 sets the first data transmission scheme to communicate with the user equipment if the first data transmission scheme is different from the data transmission scheme currently used by the user-oriented communications interface 702.

Optionally, in another embodiment, the processor 701 may be further configured to directly determine that the user-oriented communications interface 702 sets the first data transmission scheme to communicate with the user equipment.

Optionally, the wireless environment quality information includes at least one of a service rate, an RSRP, an RSCP, an SINR, a bit error rate, a QoS negotiated rate, or a CQI.

Optionally, in an embodiment, the user-oriented communications interface 702 includes a USB interface. In this case, each of the at least two candidate data transmission schemes includes at least one of an indication about whether to enable Fast IP, a USB aggregate packet size, or a USB packet transmission timeout timer threshold.

Optionally, in another embodiment, the user-oriented communications interface 702 includes a WI-FI AP interface. In this case, each of the at least two candidate data transmission schemes includes at least one of an indication about whether to enable Fast IP or a WI-FI AMSDU window size.

Further, the processor 701 is further configured to determine that the wireless data terminal starts, and determine that the user-oriented communications interface 702 sets the default data transmission scheme to communicate with the user equipment, where the default data transmission scheme belongs to the at least two candidate data transmission schemes.

Figure 8:
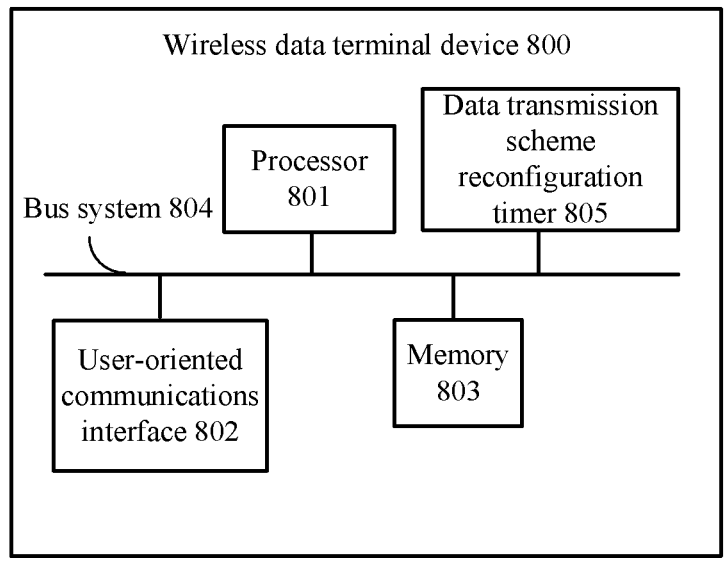
FIG. 8 is a structural block diagram of another wireless data terminal device according to an embodiment of the present disclosure.

FIG. 8 is a structural block diagram of another wireless data terminal device 800 according to an embodiment of the present disclosure. The device shown in FIG. 8 may execute each step in the methods shown in FIG. 1 to FIG. 3. As shown in FIG. 8, the wireless data terminal device 800 includes a processor 801, a user-oriented communications interface 802, and a memory 803.

Components in the wireless data terminal device 800 are coupled together using a bus system 804. The bus system 804 further includes a power bus, a control bus, and a status signal bus, in addition to a data bus. However, for clear description, various buses in FIG. 8 are marked as the bus system 804.

The methods disclosed by the foregoing embodiments of the present disclosure may be applied in the processor 801 or implemented by the processor 801. The processor 801 may be an integrated circuit chip and have a signal processing capability. In an implementation process, each step of the foregoing methods may be completed using an integrated logic circuit of hardware in the processor 801 or an instruction in a form of software. The processor 801 may be a general purpose processor, a DSP, an ASIC, an FPGA, or another programmable logic device, discrete gate or transistor logic device, or discrete hardware component. The processor 801 may implement or execute the methods, steps, and logic block diagrams disclosed in the embodiments of the present disclosure. The general purpose processor may be a microprocessor. Alternatively, the processor 801 may be any conventional processor or the like. Steps of the methods disclosed with reference to the embodiments of the present disclosure may be directly executed and completed by means of a hardware decoding processor, or may be executed and completed using a combination of hardware in a decoding processor and software modules. The software modules may be located in a mature storage medium in the art, such as a RAM, a flash memory, a ROM, a PROM, an EEPROM, or a register. The storage medium is located in the memory 803. The processor 801 reads instructions in the memory 803 and completes the steps in the foregoing methods in combination with hardware of the processor 801. The memory 803 may be further configured to store at least two candidate data transmission schemes.

The wireless data terminal device 800 further includes a data transmission scheme reconfiguration timer 805.

The processor 801 is configured to obtain first environment quality information of the wireless data terminal device 800.

Further, the processor 801 obtains the first environment quality information when the data transmission scheme reconfiguration timer 805 times out, and the data transmission scheme reconfiguration timer 805 is configured to restart when the processor 801 obtains the first environment quality information, or restart when the processor 801 determines, from the at least two candidate data transmission schemes, a first data transmission scheme corresponding to the first environment quality information. A person skilled in the art may understand that, a timing time of the data transmission scheme reconfiguration timer 805 may be fixed in the wireless data terminal device 800 during design, or a timing time may be adjusted manually by a user according to a requirement. This is not limited in the present disclosure.

Further, the data transmission scheme reconfiguration timer 805 starts timing when the wireless terminal starts.

The processor 801 is further configured to determine, from the at least two candidate data transmission schemes, the first data transmission scheme corresponding to the first environment quality information, where each candidate data transmission in the at least two candidate data transmission schemes includes parameters used for communicating with user equipment.

The user-oriented communications interface 802 is configured to set the first data transmission scheme to communicate with the user equipment.

As shown in FIG. 8, the wireless data terminal device 800 can select an appropriate data transmission scheme according to wireless environment quality to communicate with the user equipment. In this case, the wireless data terminal device 800 can adjust the data transmission scheme according to different wireless environment quality such that a better network service can be provided for the user equipment. In addition, performance of the wireless data terminal device 800 is also improved.

Optionally, in an embodiment, the processor 801 is further configured to determine whether the first data transmission scheme is the same as a data transmission scheme currently used by the user-oriented communications interface 802, and determine that the user-oriented communications interface 802 keeps the currently used data transmission scheme unchanged if the first data transmission scheme is the same as the data transmission scheme currently used by the user-oriented communications interface 802, or determine that the user-oriented communications interface 802 sets the first data transmission scheme to communicate with the user equipment if the first data transmission scheme is different from the data transmission scheme currently used by the user-oriented communications interface 802.

Optionally, in another embodiment, the processor 801 may be further configured to directly determine that the user-oriented communications interface 802 sets the first data transmission scheme to communicate with the user equipment.

Optionally, the wireless environment quality information includes at least one of a service rate, an RSRP, an RSCP, an SINR, a bit error rate, a QoS negotiated rate, or a CQI.

Optionally, in an embodiment, the user-oriented communications interface 802 includes a USB interface. In this case, each of the at least two candidate data transmission schemes includes at least one an indication about whether to enable Fast IP, a USB aggregate packet size, or a USB packet transmission timeout timer threshold.

Optionally, in another embodiment, the user-oriented communications interface 802 includes a WI-FI AP interface. In this case, each of the at least two candidate data transmission schemes includes at least one of an indication about whether to enable Fast IP or a WI-FI AMSDU window size.

Further, the processor 801 is further configured to determine that the wireless data terminal starts, and determine that the user-oriented communications interface 802 sets the default data transmission scheme to communicate with the user equipment, where the default data transmission scheme belongs to the at least two candidate data transmission schemes.

Figure 9:
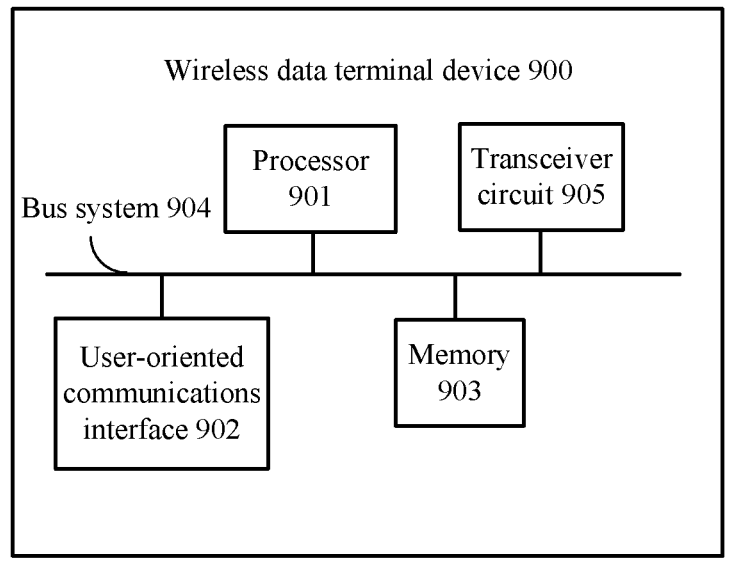
FIG. 9 is a structural block diagram of another wireless data terminal device according to an embodiment of the present disclosure.

FIG. 9 is a structural block diagram of another wireless data terminal device 900 according to an embodiment of the present disclosure. The device shown in FIG. 9 may execute each step in the methods shown in FIG. 1 to FIG. 3. As shown in FIG. 9, the wireless data terminal device 900 includes a processor 901, a user-oriented communications interface 902, and a memory 903.

Components in the wireless data terminal device 900 are coupled together using a bus system 904. The bus system 904 further includes a power bus, a control bus, and a status signal bus, in addition to a data bus. However, for clear description, various buses in FIG. 9 are marked as the bus system 904.

The methods disclosed by the foregoing embodiments of the present disclosure may be applied in the processor 901 or implemented by the processor 901. The processor 901 may be an integrated circuit chip and have a signal processing capability. In an implementation process, each step of the foregoing methods may be completed using an integrated logic circuit of hardware in the processor 901 or an instruction in a form of software. The processor 901 may be a general purpose processor, a DSP, an ASIC, an FPGA, or another programmable logic device, discrete gate or transistor logic device, or discrete hardware component. The processor 901 may implement or execute the methods, steps, and logic block diagrams disclosed in the embodiments of the present disclosure. The general purpose processor may be a microprocessor. Alternatively, the processor 901 may be any conventional processor or the like. Steps of the methods disclosed with reference to the embodiments of the present disclosure may be directly executed and completed by means of a hardware decoding processor, or may be executed and completed using a combination of hardware in a decoding processor and software modules. The software modules may be located in a mature storage medium in the art, such as a RAM, a flash memory, a ROM, a PROM, an EEPROM, or a register. The storage medium is located in the memory 903. The processor 901 reads instructions in the memory 903 and completes the steps in the foregoing methods in combination with hardware of the processor 901. The memory 903 may be further configured to store at least two candidate data transmission schemes.

The wireless data terminal device 900 further includes a transceiver circuit 905.

The transceiver circuit 905 is configured to receive a data transmission scheme reconfiguration request sent by user equipment.

The processor 901 is further configured to obtain first environment quality information of the wireless data terminal device 900 when the transceiver circuit 905 receives the data transmission scheme reconfiguration request.

The processor 901 is further configured to determine, from the at least two candidate data transmission schemes, a first data transmission scheme corresponding to the first environment quality information, where each of the at least two candidate data transmission schemes includes parameters used for communicating with user equipment.

The user-oriented communications interface 902 is configured to use the first data transmission scheme to communicate with the user equipment.

As shown in FIG. 9, the wireless data terminal device 900 can select an appropriate data transmission scheme according to wireless environment quality to communicate with the user equipment. In this case, the wireless data terminal device 900 can adjust the data transmission scheme according to different wireless environment quality such that a better network service can be provided for the user equipment. In addition, performance of the wireless data terminal device 900 is also improved.

Optionally, in an embodiment, the processor 901 is further configured to determine whether the first data transmission scheme is the same as a data transmission scheme currently used by the user-oriented communications interface 902, and determine that the user-oriented communications interface 902 keeps the currently used data transmission scheme unchanged if the first data transmission scheme is the same as the data transmission scheme currently used by the user-oriented communications interface 902, or determine that the user-oriented communications interface 902 sets the first data transmission scheme to communicate with the user equipment if the first data transmission scheme is different from the data transmission scheme currently used by the user-oriented communications interface 902.

Optionally, in another embodiment, the processor 901 may be further configured to directly determine that the user-oriented communications interface 902 sets the first data transmission scheme to communicate with the user equipment.

Optionally, the wireless environment quality information includes at least one of a service rate, an RSRP, an RSCP, an SINR, a bit error rate, a QoS negotiated rate, or a CQI.

Optionally, in an embodiment, the user-oriented communications interface 902 includes a USB interface. In this case, each of the at least two candidate data transmission schemes includes at least one of an indication about whether to enable Fast IP, a USB aggregate packet size, or a USB packet transmission timeout timer threshold.

Optionally, in another embodiment, the user-oriented communications interface 902 includes a WI-FI AP interface. In this case, each of the at least two candidate data transmission schemes includes at least one of the following parameters an indication about whether to enable Fast IP or a WI-FI AMSDU window size.

Further, the processor 901 is further configured to determine that the wireless data terminal starts, and determine that the user-oriented communications interface 902 sets the default data transmission scheme to communicate with the user equipment, where the default data transmission scheme belongs to the at least two candidate data transmission schemes.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the other approaches, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a USB flash drive, a removable hard disk, a ROM, a RAM, a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for determining a data transmission scheme, comprising:
    obtaining, by a wireless data terminal, first environment quality information of the wireless data terminal;
    determining, by the wireless data terminal, from at least two candidate data transmission schemes, a first data transmission scheme corresponding to the first environment quality information, wherein each of the at least two candidate data transmission schemes comprises parameters used for communicating with user equipment; and
    setting, by the wireless data terminal, the first data transmission scheme to communicate with the user equipment by communicating with the user equipment through a WI-FI access point (AP) interface, wherein each of the at least two candidate data transmission schemes comprises at least one of an indication about whether to enable Fast Internet Protocol (IP) or a WI-FI aggregate medium access control service data unit (AMSDU) window size.

2. The method of claim 1, wherein setting the first data transmission scheme to communicate with the user equipment comprises:
    determining, by the wireless data terminal, whether the first data transmission scheme is the same as a data transmission scheme currently used by the wireless data terminal;
    keeping, by the wireless data terminal, the currently used data transmission scheme unchanged when the first data transmission scheme is the same as the data transmission scheme currently used by the wireless data terminal; and
    setting, by the wireless data terminal, the first data transmission scheme to communicate with the user equipment when the first data transmission scheme is different from the data transmission scheme currently used by the wireless data terminal.

3. The method of claim 1, wherein obtaining the first environment quality information comprises obtaining, by the wireless data terminal, the first environment quality information when a data transmission scheme reconfiguration timer times out, wherein the data transmission scheme reconfiguration timer determines a time at which the first environment quality information needs to be obtained, and wherein obtaining the first environment quality information when the data transmission scheme reconfiguration timer times out comprises:
    restarting, by the wireless data terminal, the data transmission scheme reconfiguration timer when obtaining the first environment quality information; and
    restarting, by the wireless data terminal, the data transmission scheme reconfiguration timer when determining, from the at least two candidate data transmission schemes, the first data transmission scheme corresponding to the first environment quality information.

4. The method of claim 1, wherein obtaining the first environment quality information comprises obtaining, by the wireless data terminal, the first environment quality information when receiving a data transmission scheme reconfiguration request from the user equipment.

5. The method of claim 1, wherein the first environment quality information comprises at least one of a service rate, a reference signal received power (RSRP), a received signal code power (RSCP), a signal to interference plus noise ratio (SINR), a bit error rate, a quality of service (QoS) negotiated rate, or a channel quality indicator (CQI).

6. The method of claim 1, wherein before obtaining the first environment quality information, the method further comprises starting and setting, by the wireless data terminal, a default data transmission scheme to communicate with the user equipment, and wherein the default data transmission scheme belongs to the at least two candidate data transmission schemes.

7. A wireless data terminal device, comprising:
    a processor configured to:
        obtain first environment quality information of the wireless data terminal device; and
        determine, from at least two candidate data transmission schemes, a first data transmission scheme corresponding to the first environment quality information, wherein each candidate data transmission in the at least two candidate data transmission schemes comprises parameters used for communicating with user equipment; and
    a user-oriented communications interface coupled to the processor and configured to set the first data transmission scheme to communicate with the user equipment, wherein the user-oriented communications interface comprises a WI-FI access point (AP) interface, and wherein each of the at least two candidate data transmission schemes comprises at least one of an indication about whether to enable Fast Internet Protocol (IP) or a WI-FI aggregate medium access control service data unit (AMSDU) window size.

8. The wireless data terminal device of claim 7, wherein the processor is further configured to:
    determine whether the first data transmission scheme is the same as a data transmission scheme currently used by the user-oriented communications interface;
    determine that the user-oriented communications interface keeps the currently used data transmission scheme unchanged when the first data transmission scheme is the same as the data transmission scheme currently used by the user-oriented communications interface; and
    determine that the user-oriented communications interface sets the first data transmission scheme to communicate with the user equipment when the first data transmission scheme is different from the data transmission scheme currently used by the user-oriented communications interface.

9. The wireless data terminal device of claim 7, further comprising a data transmission scheme reconfiguration timer coupled to the processor and the user-oriented communications interface and configured to start timing when the wireless data terminal device starts, wherein the processor is further configured to obtain the first environment quality information when the data transmission scheme reconfiguration timer times out, and wherein the data transmission scheme reconfiguration timer is further configured to:
- restart when the processor obtains the first environment quality information; and
- restart when the processor determines, from the at least two candidate data transmission schemes, the first data transmission scheme corresponding to the first environment quality information.

10. The wireless data terminal device of claim 7, further comprising a transceiver circuit coupled to the processor and the user-oriented communications interface and configured to receive a data transmission scheme reconfiguration request from the user equipment, and wherein the processor is further configured to obtain the first environment quality information when the transceiver circuit receives the data transmission scheme reconfiguration request.

11. The wireless data terminal device of claim 7, wherein the wireless environment quality information comprises at least one of a service rate, a reference signal received power (RSRP), a received signal code power (RSCP), a signal to interference plus noise ratio (SINR), a bit error rate, a quality of service (QoS) negotiated rate, or a channel quality indicator (CQI).

12. The wireless data terminal device of claim 7, wherein the processor is further configured to:
- determine that the wireless data terminal device starts; and
- determine that the user-oriented communications interface sets the default data transmission scheme to communicate with the user equipment, and
- wherein the default data transmission scheme belongs to the at least two candidate data transmission schemes.

13. A method for determining a data transmission scheme, comprising:
- obtaining, by a wireless data terminal, first environment quality information of the wireless data terminal;
- determining, by the wireless data terminal, from at least two candidate data transmission schemes, a first data transmission scheme corresponding to the first environment quality information, wherein each of the at least two candidate data transmission schemes comprises parameters used for communicating with user equipment; and
- setting, by the wireless data terminal, the first data transmission scheme to communicate with the user equipment by setting the first data transmission scheme to communicate with the user equipment through a Universal Serial Bus (USB) interface, and wherein each of the at least two candidate data transmission schemes comprises at least one of an indication about whether to enable Fast Internet Protocol (IP), a USB aggregate packet size, or a USB packet transmission timeout timer threshold.

14. A wireless data terminal device, comprising:
a processor configured to:
- obtain first environment quality information of the wireless data terminal device; and
- determine, from at least two candidate data transmission schemes, a first data transmission scheme corresponding to the first environment quality information, wherein each candidate data transmission in the at least two candidate data transmission schemes comprises parameters used for communicating with user equipment; and a user-oriented communications interface coupled to the processor and configured to set the first data transmission scheme to communicate with the user equipment, wherein the user-oriented communications interface comprises a Universal Serial Bus (USB) interface, and wherein each of the at least two candidate data transmission schemes comprises at least one of an indication about whether to enable Fast Internet Protocol (IP), a USB aggregate packet size, or a USB packet transmission timeout timer threshold.

* * * * *

UNITED STATES PATENT AND TRADEMARK OFFICE
CERTIFICATE OF CORRECTION

PATENT NO. : 10,568,127 B2
APPLICATION NO. : 15/764229
DATED : February 18, 2020
INVENTOR(S) : Anmeng Zhao and Kaibing Zhang Page 1 of 1

It is certified that error appears in the above-identified patent and that said Letters Patent is hereby corrected as shown below:

In the Claims

Claim 5, Column 26, Line 18: "a hit error rate" should read "a bit error rate"

Signed and Sealed this
Twelfth Day of May, 2020

Andrei Iancu
*Director of the United States Patent and Trademark Office*